United States Patent [19]
Iwasaki et al.

[11] Patent Number: 5,285,193
[45] Date of Patent: Feb. 8, 1994

[54] DATA BASE SYSTEM

[75] Inventors: Keisuke Iwasaki, Tenri; Masaki Takakura, Higashiosaka; Yasukuni Yamane; Noritoshi Kako, both of Nara, all of Japan

[73] Assignee: Sharp Kabushiki Kaisha, Osaka, Japan

[21] Appl. No.: 798,353

[22] Filed: Nov. 21, 1991

Related U.S. Application Data

[63] Continuation of Ser. No. 542,792, Jun. 25, 1990, abandoned, which is a continuation of Ser. No. 144,532, Jan. 15, 1988, abandoned.

[30] Foreign Application Priority Data

Jan. 16, 1987 [JP] Japan .................................. 62-8546
Jan. 16, 1987 [JP] Japan .................................. 62-8547

[51] Int. Cl.⁵ .................................. G09G 5/00
[52] U.S. Cl. .................................. 345/133; 395/140; 345/189
[58] Field of Search ............... 340/723, 724, 728, 747, 340/799; 395/140

[56] References Cited

U.S. PATENT DOCUMENTS

| | | | |
|---|---|---|---|
| 4,189,744 | 2/1980 | Stern | 340/747 |
| 4,257,044 | 3/1981 | Fukuoka | 340/723 |
| 4,656,603 | 4/1987 | Dunn | 340/747 |
| 4,683,468 | 7/1987 | Himelstein et al. | 340/747 |
| 4,686,522 | 8/1987 | Hernandez et al. | 340/723 |
| 4,689,616 | 8/1987 | Goude et al. | 340/724 |
| 4,698,625 | 10/1987 | McCaskill et al. | 340/723 |
| 4,700,181 | 10/1987 | Maine et al. | 340/747 |
| 4,700,182 | 10/1987 | Ohgami | 340/723 |
| 4,703,321 | 10/1987 | Barker et al. | 340/724 |
| 4,803,477 | 2/1989 | Miyatake et al. | 340/723 |

FOREIGN PATENT DOCUMENTS 0206565 12/1986 European Pat. Off.
2157036 10/1985 United Kingdom.

Primary Examiner—Richard Hjerpe

[57] ABSTRACT

A system which includes a chart forming section for forming a pattern of a chart to be displayed on a screen, a recording section for recording, per each record, attribute information which designates a predetermined position on the chart, a display section for displaying the chart formed by the chart forming device on the screen and also for displaying a symbol at the predetermined position on the chart as designated by each attribute information, and a designating section capable of designating the record corresponding to the attribute information which indicates the position of the symbol by specifying any of the symbol on the chart displayed on the screen by the display section.

10 Claims, 5 Drawing Sheets

Fig. 6(A)

| ID NO. | PART IMAGE DATA |
|---|---|
| 1 | |

Fig. 6(B)

| ID NO. | PART IMAGE DATA |
|---|---|
| 2 | □ □ □ / □ □ □ / □ □ □ |

Fig. 6(C)

| ID NO. | PART IMAGE DATA |
|---|---|
| 3 | o o o / o o o / o o o |

Fig. 6(D)

| ID NO. | PART IMAGE DATA |
|---|---|
| 4 | △ △ △ / △ △ △ / △ △ △ |

Fig. 6(E)

| ID NO. | PART IMAGE DATA |
|---|---|
| 5 | |

Fig. 6(F)

| ID NO. | PART IMAGE DATA |
|---|---|
| 6 | |

Fig. 7(A)

| PART NAME | ID NO. |
|---|---|
| MAIN BODY | 1 |
| BUTTON | 2, 3, 4 |
| CORNER | 5, 6 |

Fig. 7(B)

|  | MAIN BODY | BUTTON | CORNER |
|---|---|---|---|
| COORD. | (0,0) | (200,200) | (0,400) |

Fig. 7(C)

| PROD. NO. \ PART NAME | MAIN BODY | BUTTON | CORNER |
|---|---|---|---|
| I | 1 | 4 | 6 |
| II | 1 | 2 | 5 |
| III | 1 | 3 | 5 |

DATA BASE SYSTEM

This application is a continuation of U.S. patent application Ser. No. 07/542,792 filed on Jun. 25, 1990, now abandoned, which is a continuation of U.S. patent application Ser. No. 07/144,532, filed on Jan. 15, 1988, now abandoned.

BACKGROUND OF THE INVENTION

The present invention relates to a data base system for recording and managing various data, and further, to an image data managing unit which records image data newly prepared or processed and also outputs the recorded image data for display, printing or processing, etc. in an image data base for processing image data.

Management of information by the aid of the data base system is extremely convenient particularly when records in the file are to be searched for, since an operator can set various conditions for character-strings or numerical values serving as keys for retrieval so as to freely derive the record while monitoring such conditions. Further, he can directly take out the specific record through employment of identification numbers or ID numbers (referred to as ID numbers hereinafter) and other identification symbols.

In the above-mentioned data base system, however, it has been impossible to directly take out the specific record unless the operator exactly knows in advance the ID numbers and other identification symbols. Further, if the operator is unaware thereof, he is required at least to accurately input the character-strings, numerical values from keys, or conditions for retrieval therefor in order to effect the retrieval as desired. Accordingly, in the known data system, there has been a problem in that, in the case where the operator must effect the retrieval of records based only on a vague query thereof, the work for the retrieval becomes very difficult, requiring troublesome procedures.

Meanwhile, there are cases where keys for the respective records are initially present in a hierarchical structure so as to enable a retrieval which is vague to a certain extent. However, since, in such a hierarchical structure records are classified in a univocal standard, it hardly serves the purpose when the standard of the retrieval differs even slightly from fixed standard.

Moreover, in an image data managing unit for a conventional image data base, it has been a practice which where the image data manages one image by one image within a data file as independent record respectively.

However, in the case where the large number of image data to be managed in the data file by the image data managing unit as described above are a group of images resembling each other, and any image which are managed by the unit are those formed only by combination of some kinds of elements, or those including different factors respectively, but having some elements partly common to each other, there exist such problems as will be described subsequently.

(1) Since many images have same identical elements, identical bit patterns, etc. are present in duplication, in different regions of the memory unit which stored the respective image data, thus wastefully requiring a large memory capacity.

(2) Due to the fact that respective image data for one image are each stored as independent records within the data file, in the case where alteration is effected with respect to the common element, it is necessary to independently carry out the same image data alteration processing with respect to the element for each image, thus making the work overly burdensome.

(3) When only part of the element with respect to one image is intended to be altered, even if the same image data as the element after the alteration is already present at part of the image data for the other record, alteration processing of the image data must be effected for each element in a similar manner as occurred with regard to the first element, with an increase on the burden of work. Meanwhile, in the case where only the position in part of the element is to be altered with respect to one image, the image data must be newly altered in a similar manner when changing a fresh element.

(4) In the case where a plurality of images, which differ only in a part of the elements are prepared so as to effect comparative review of the images by sequential change-over thereof, it is required to fully output the entire image data for one image onto a display unit, including the image data of the common element, and thus, much more processing time is necessary with a consequent increase of waiting time for the operator.

SUMMARY OF THE INVENTION

Accordingly, an essential object of the present invention is to provide a data base system which is capable of effecting retrieval work, efficiently and accurately in a simple manner without an excessive burden on the part of an operator.

Another important object of the present invention is to provide an image data managing unit which is simplified in operation and accurate in functioning, with substantial elimination of disadvantages inherent in the conventional arrangements of this kind.

In accomplishing these and other objects, according to one aspect of the present invention, there is a data base system provided which includes a chart forming device for forming a pattern of a chart to be displayed on a screen; a recording device for recording, for each record, attribute information which designates a predetermined position on the chart; a display device for displaying the chart formed by the chart forming device on the screen and also for displaying a symbol at a predetermined position on the chart as designated by each attribute information; and a designating device capable of designating the record corresponding to the attribute information which indicates the position of the symbols by specifying any of the symbols on the chart which have been displayed on the screen by the display device.

Accordingly, in the data base system of the present invention, the chart forming device forms the chart by the bit patterns, for example. The form of such chart may be determined by the content of the attribute information for each record, and generally in a map, graph or similar display which is capable of representing a positional relationship between the respective records. For the recording device, besides preparing a managing table for correspondence between the respective records and attribute information, it may be so arranged as to record the attribute information as one or more items within each of the records. This attribute information is represented by coordinates, for example, for indicating a predetermined position on the chart. The display device displays the chart on the screen, and also displays a symbol at a predetermined position on the chart as designated by the attribute information. Such symbols may include numerical values for the respective records, identification symbols, etc., in addition to points, common marks and similar marking.

If the chart and the symbol overlapping the chart are displayed on the screen, it becomes possible for the operator to visually grasp the relation between the respective records, for example, two-dimensional positional relation and such. The designating device specifies the symbol, for example, by overlapping a pointing mark to be made movable through operation by the operator with the symbol on the screen. When a certain symbol is specified, retrieval of the attribute information for designating the position of the symbol is effected, and the record corresponding to this attribute information is designated. The content of the record thus designated is displayed on the screen in the similar manner as in the case of designation by ID numbers, etc., and it becomes possible to effect various other processings.

In another aspect of the present invention there is provided an image data managing unit which includes an image data memory for storing part image data parts representing any desired portion of one image and also attribute information of the part image data respectively; a combination memory device for storing combination information which represents the combination of respective image data parts necessary for forming one image by enumerating each of the attribute information; a position memory device for storing positional information which designates respective positions on the image, of the respective image data parts necessary for forming one image; and an image output device means which respectively reads out, from the image data memory, the image data part corresponding to the respective attribute information enumerated in the combination information stored by the combination memory device, and which outputs the respective image data part as read out so as to be disposed at the predetermined positions on the image according to the positional information stored by the position memory device.

Thus, in the image data managing unit according to the present invention as referred to above, the part image data part is composed, for example, of the bit pattern, and has any desired size within one image. Each part image data part representing an arbitrary portion of one image may be adapted to form one image by combining or tiling respective data and also by overlapping part or an entire portion thereof. The attribute information is constituted by ID numbers (i.e. identification numbers) for identifying the image data part. The image data memory includes, for example, a memory unit such as a hard disc or a similar type memory, and a managing device for managing the input and output of the memory unit. This managing device causes the part image data part and the attribute information corresponding to the image data part, to be stored in the memory unit as one record in the data file for management mainly by the ID number as the key.

The combination information is intended to designate one or more image data parts necessary for the formation of one image. This combination information may be one which enumerates only part of the attribute information, besides that enumerating all of the contents of the attribute information of the required part image data part, but should contain at least one identification symbol corresponding to the image data part at 1:1 for example, as in the ID number.

The object of the positional information is to indicate the position of the respective image data part on the image as designated by the combination information. There is, for example, such a practice that, with one image represented by a bit map, the reference position of the image data part is indicated by the coordinates on this bit map.

The combination memory means and the position memory means have the construction similar to that of the image data memory, and the same hardware may be utilized therefor. Moreover, the software for the managing device may be arranged to be one which may be commonly used. This managing device in the combination memory device causes the respective combination information to be stored in the memory unit as each one record for each in the data file different from the image data memory, with the one record corresponding to one image. In the case where, for example, positions of the respective image data part have the same part name of the element common in all of the images, the positional information may be stored in the memory device as the data file different from the image data memory and the combination memory device so as to be referred to for the formation of the respective images. Meanwhile, even in the same image data part, in the case where the positions thereof on the respective images are different from each other, it may be arranged so as to include the respective positional information in the record of each combination information.

It is to be noted here that, when the positional information each corresponding to the respective attribute information of the image data part is contained in the record of the combination information, such information as the part name, etc. of the respective part image data is not necessarily required. However, in the case where the positional information is in different data files, it is necessary to affix part information or the like for each image data part so as to correspond to the respective attribute information of the combination information, to the respective coordinates of the positional information. Such part information may be included in the attribute information of the part image data, and may also be constituted by forming data files enumerating attribute information of one or more image data parts equivalent to respective part names. If such part information is available, it is convenient in the case where the combination information, etc. is to be formed.

The image output device first reads out from the combination memory device, the combination information corresponding to the image required by the operator, and then, reads out from the image data memory one or more image data parts corresponding to, for example, ID numbers enumerated in the combination information as read out. Subsequently, the device arranges the respective image data parts at predetermined positions, for example, on the bit map according to the respective positional information newly read out from the position memory device or respective positional information already read out together with the combination information. The image data thus formed is outputted to the image display unit for display on the display screen, and is subjected to corrections such as alterations through operation by an operator depending on necessity or it is outputted to a printing unit for preparation of hard copy, or similar record medium.

BRIEF DESCRIPTION OF THE DRAWINGS

These and other objects and features of the present invention will become apparent from the following description taken in conjunction with the preferred embodiment thereof with reference to the accompanying drawings, in which;

FIG. 1 is a schematic block diagram showing a general construction of hardware for a data base system according to one preferred embodiment of the present invention, FIG. 2 is a diagram showing a display screen on which a chart is displayed, FIG. 3 is a diagram showing the display screen on which the chart and symbols are displayed, and FIGS. 4 and 5 are flow-charts respectively for explaining functions of the data base system of the present invention.

FIGS. 6(A) to 9(B) are related to a second embodiment of the present invention;

FIGS. 6(A) to 6(F) are diagrams for respectively explaining image data parts and record structure of ID numbers, FIG. 7(A) is a diagram for explaining the structure of the data file for part information, FIG. 7(B) is a diagram for explaining structure of the data file for positional information, FIG. 7(C) is a diagram for explaining structure of the data file for combination information, FIG. 8, is schematic block diagram showing a construction of an image data base system for the second embodiment of the present invention, FIG. 9(B) is a diagram similar to FIG. 9(A), which particularly shows an image of a product No. "III".

DETAILED DESCRIPTION OF THE INVENTION

Figure 1:
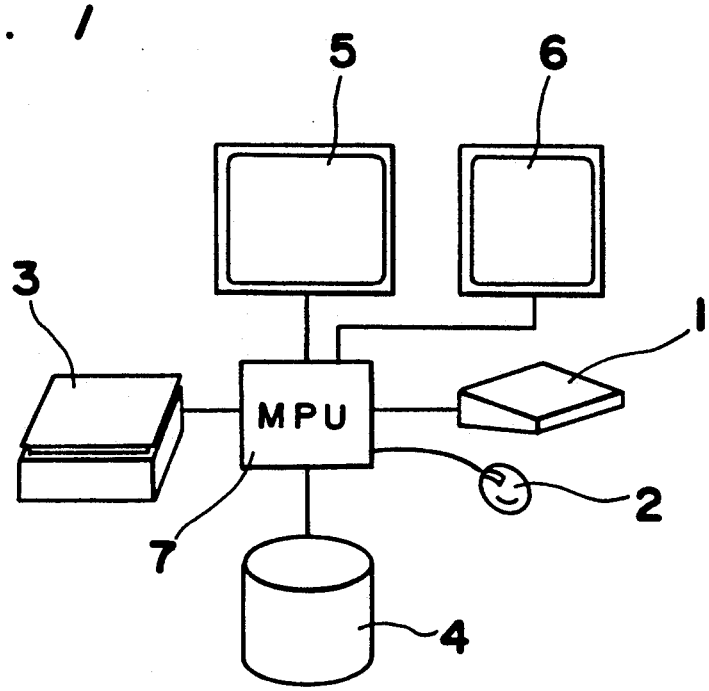
In FIGS. 1 to 5 are related to a first embodiment according to the present invention.

Before the description of the present invention proceeds, it is to be noted that like parts are designated by like reference numerals throughout the accompanying drawings.

Referring now to the drawings, the present invention will be described in detail according to embodiments thereof as illustrated in the accompanying figures.

FIRST EMBODIMENT

FIGS. 1 to 5 relate to a first embodiment of the present invention in which the information to be managed is assumed to be of two-dimensional image data.

In FIG. 1, there is shown the hardware for a data base system according to the first embodiment of the present invention, which generally includes a keyboard 1, a mouse 2, an image input device 3, an external memory device 4, a first image display device 5 and a second image display device 6, all of which are respectively coupled to a processor unit 7 as shown. The keyboard 1 is an input device for an operator to apply instructions, information, etc. to the processor unit 7. The mouse 2, which is also an input device for the operator to send instructions to the processor unit 7, is used in this embodiment, to effect displacement of a pointing mark displayed on the display screen of the second image display device 6. The image input device 3 is an input device which reads images drawn on a paper sheet or similar record material so as to form image data. Meanwhile, the external memory device 4 is a memory device such as a hard disc, etc. for storing processing programs for the data base, respective files processed by the programs, and patterns of charts, etc. The first image display device 5 is a bit map display for displaying a two-dimensional image data on a CRT screen. The second image display device 6 is a bit map display for displaying charts and symbols on the CRT screen.

Figure 2:
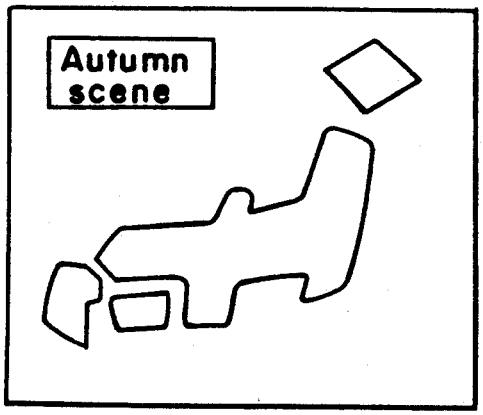

The external memory device 4 stores the bit pattern of the chart formed through employment of the image input device 3, etc., and sends out the bit pattern of this chart to the second image display device 6 as a chart forming device. As shown in FIG. 2, the chart is composed of a rough white map of Japan, and characters of "Autumn scene" for explaining content of the image data file. Moreover, the external memory device 4 stores respective files to be processed together with the processing programs for the data base system. These files first store as image data files, the image data representing photographs for scenery in autumn in Japan, in the respective records with ID numbers affixed. Meanwhile, as the recording device, there is provided a file for a managing table which shows coordinates on the chart by "X coordinate" and "Y coordinate" as shown in Table 1 given below.

TABLE 1

| ID No. | X Coordinate | Y Coordinate |
|---|---|---|
| 1 | 127 | 73 |
| 2 | 368 | 211 |
| 3 | 249 | 157 |
| 4 | 315 | 96 |

Figure 3:
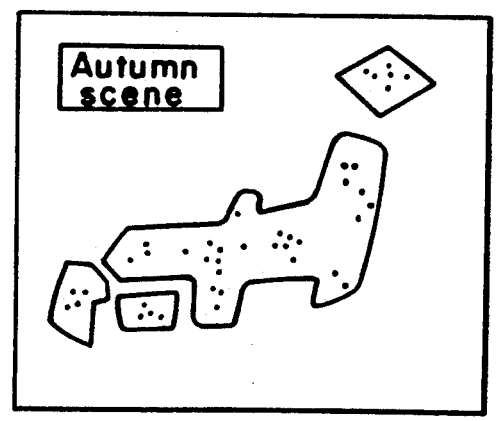

The figures in the above items for the "X coordinate" and "Y coordinate" respectively show positions in the directions of X axis and Y axis on the chart shown in FIG. 2, thus both indicating the coordinates on the chart. The positions indicated by these coordinates are those which show, in the map of Japan on the chart, places where the image data in the respective records are photographed. The respective coordinates are affixed with the ID numbers of the equivalent image data on the image data files, so as to correspond to any of the autumn scene photographs as attribute information. The first image display device 5 displays the autumn scene photograph by the image data of the designated record. The second image display device 6 displays as a display means, the chart forwarded from the external memory device 4 on the screen, and also reads out the respective coordinates of the managing table so as to display a point as the symbol at the position indicated by these coordinates. Then on the display screen of this second image display device 6, many points are shown to overlap the map of Japan on the chart as shown in FIG. 3, thereby to indicate that the autumn scene photographs of the areas displayed by these points are prepared in the image data files. On the display screen of this second image display device 6, a pointing mark is simultaneously displayed, and through operation of the mouse 2, by the operator, this pointing mark may be displaced on the display screen. Thus, as an indicating device, when the operator depresses, for example, a CR key of the keyboard 1, in a state where the pointing mark is overlapped with any of the points, the overlapping point is specified, and retrieval of the coordinates indicating said point is effected from the managing table, while, designation of the record of the image data file is automatically effected based on the ID number affixed to the coordinates as retrieved. Upon designation of the record of the image data file, the autumn scene photograph is displayed, for example, on the first image display device 5 together with the ID number of said record.

Figure 4:
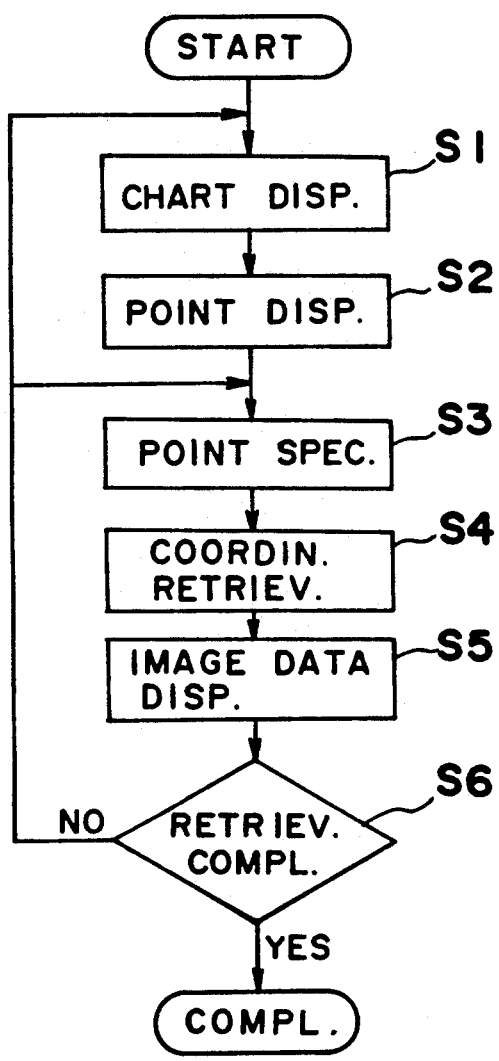
Figure 5:
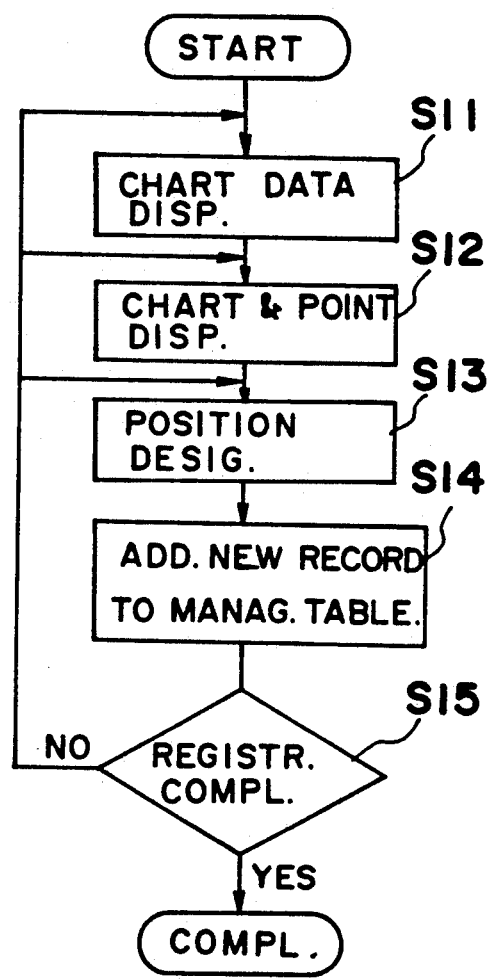

Subsequently, functioning of the data base system of the present invention as described so far will be explained with reference to flow-charts of FIGS. 4 and 5.

In the first place, at Step S1, the chart stored in the external memory device 4 is displayed on the display screen of the second image display device 6. Next, at Step S2, the respective coordinates of the managing table stored in the external memory device 4 are read out, and a point is displayed at the position indicated by the coordinates so as to overlap the previous chart. Thus, when the operator specifies the point through operation of the mouse 2 (Step S3), retrieval of the coordinates indicating the point is effected (Step S4), and the record in the image data file corresponding to the coordinates is designated, while, the image data within said record is displayed on the first image display device 5 (Step S5). For specifying another point again, the procedure returns to Step S3, and in a case where retrieval is to be effected by different attribute through employment of still another chart, the procedure returns to Step S1, and processing is terminated upon completion of the retrieval (Step S6).

Hereinbelow, functioning in the case where new image data are registered in the above data base system will be explained with reference to the flow-chart of FIG. 5.

Firstly, a fresh autumn scene photograph is entered into the data base system by the image input device 3, etc., as the image data, and after preparation of a fresh record affixed with an ID number in the image data file, the image is displayed on the first image display device 5 (Step S11). Subsequently, the chart as stored in the external memory device 4 and the respective points indicated by the coordinates of the managing table are displayed on the display screen of the second image display device 6. (Step S12). Then, the operator indicates the position on the chart through operation of the mouse 2 (Step S13). The position indicated by the operator is so set that, if the image to be newly registered is of the autumn scene photograph in Sendai, Japan, the position of Sendai is identified in the map of Japan on the chart. Thereafter, the coordinates for the position thus indicated are automatically read, and the record of the coordinates is added to the managing table, with the corresponding ID number affixed (Step S14). For registering the same image at the other position also, the procedure returns to Step S13, and for registration in another chart showing a different attribute, the procedure returns to Step S12. However, in the case where the other image is to be registered, the procedure returns to Step S11, with the processing terminating upon completion of the registration (Step S15). It is to be noted here that, in the present embodiment, since the same image data never has more than two coordinates on the identical chart, the loop returning to Step S13 is not used.

As is seen from the foregoing description, the data base system according to the present invention is provided with the chart forming device for forming a pattern of a chart to be displayed on the display screen; the recording device for recording, for each record, attribute information which designates with predetermined position on said chart; the display device for displaying the chart formed by the chart forming device on the screen and also for displaying the symbol at the predetermined position of chart as designated by each attribute information; and the designating device being capable of designating the record corresponding to the attribute information which indicates the position of the symbol by specifying any of the symbol on the chart displayed on the screen by the display device.

By the above arrangement of the present invention, it is possible to readily retrieve the record of the object by a visual method, even if the operator is not accurately aware of the attribute of the record. Moreover, complicated file structure may be easily understood, since the relation between the respective records can be visually recognized. Accordingly, by the data base system of the present invention, it becomes possible to effect flexible and proper information management according to the contents of data.

SECOND EMBODIMENT

FIGS. 6 to 9 relate to a second embodiment of the present invention.

Figure 8:
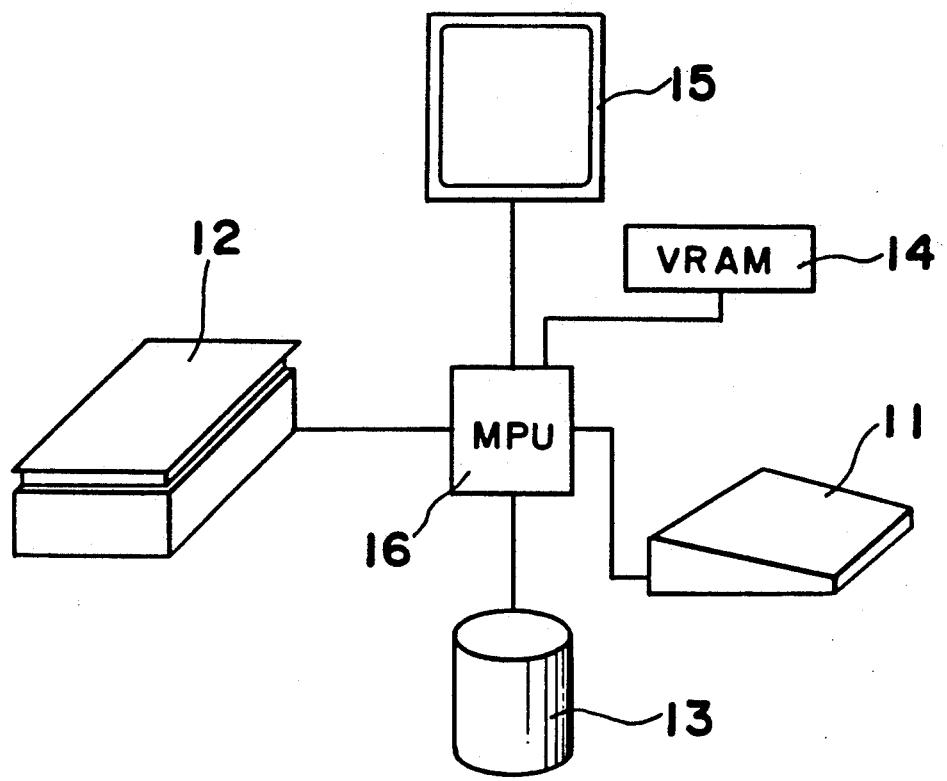

In FIG. 8, there is shown an image data base system according to a second embodiment of the present invention; which includes a keyboard 11, an image input device 12; an external memory device 13; a VRAM 14; and an image display device 15, which are each connected to a processor unit 16 as illustrated. The keyboard 11, as the input device, is intended to send instruction, information, etc. to the processor unit 16 via the operator. The image input device 12 functions as the input device which reads images drawn on a paper sheet, etc., so as to form image data. The external memory device 13 serves as the memory device, such as a hard disc or similar type memory, which stores the image data part and attribute information thereof, combination information, positional information, and processing program of the image data base, etc. The VRAM 14 is a random access memory (RAM) which temporarily stores, on the bit map, the image data displayed on the image display device 15, which is a bit map display for displaying the image data stored in the VRAM 14. The processor unit 16, constituted by a microcomputer and its peripheral devices is arranged to read and execute the processing program of the image data base stored in the external memory device 13, thereby to write in the VRAM 4, the image data inputted from the image input device 12 or image data part etc. read out from the external memory device 13 based on the instruction from the keyboard 11 for display on the image display device 15, and also for effecting various processings.

Subsequently, by way of example, description will be given with reference to a case where external shape designing for a telephone set is effected through employment of the image data base system shown in FIG. 8.

In the case where such external shape designing for a telephone set is to be made, it becomes indispensable to comparatively study differences in shapes of push-buttons or in the rounding at corner portions of the telephone sets, and also to develop variations thereof. For this purpose, the external shape of the telephone set is first divided into three sections comprising the main body, push-button, and corner portion. One or more image data parts are formed per each factor by the image input device 2 for storing in the external memory device 13. As shown in FIGS. 6(A) to 6(F), the respective image data parts stored in the external memory device 13 are affixed with ID numbers for the attribute information, and accommodated in the respective records within the data file. FIG. 6(A) shows the image data part representing the shape of the main body in the telephone set, and in this embodiment, only this one kind is prepared as the main body shape. FIGS. 6(B) to 6(D) are the image data parts showing shapes of the push-buttons in the telephone set, and in this embodiment, three kinds of push-button shapes, i.e. square, circular and triangular shapes, are prepared. Meanwhile, FIGS. 6(E) and 6(F) are the image data parts respectively showing the shapes at the corner portions of the telephone set, and in this embodiment, two kinds of corner shapes, i.e. rounded corner and squarish corner shapes, are prepared as illustrated.

Subsequently, by the operation of the keyboard 11 by the operator, data files for the part information, positional information, and combination information are prepared as shown in FIGS. 7(A) to 7(C) for storing in the external memory device 3. More specifically FIG. 7(A) shows the data file structure for the part information, in which the image data parts are classified according to the parts by enumerating the part names and ID numbers corresponding thereto. FIG. 7(B) represents the data file structure for the positional information, in which positions of the respective parts on the image are indicated by the bit map coordinates. In the present embodiment, through employment of a bit map of 500×500 in the number of picture elements and having the coordinates (0,0) at the left upper corner of the display, and the coordinates (499,499) at the right lower corner thereof in the image display device 15, it is arranged so that the left upper corner of the part image data form the main body is located at the coordinates (0,0), the left upper corner of the part image data for the push-buttons is positioned at the coordinates (200,200), and the left upper corner of the part image data for the corner shape is located at the coordinates (0,400). In this embodiment, although such positional information is univocally determined with respect to each part, it may be so modified that, a plurality of combination are preliminarily stored for selection of any required one during the image formation. FIG. 7(C) shows the data file structure for the combination information, in which, with respect to each product number corresponding to one image, the ID number of the part image data to be combined therewith is designated according to each part. In FIG. 7(C), it is shown that, in the product No. "I", the image data part of the ID No. 1 is designated with respect to the main body, the image data part of the ID No. 4 is designated with respect to the push-buttons, and the image data part of the ID No. 6 is designated with respect to the corner portions.

As described above, in the present embodiment, although the part information, positional information, and combination information must be stored in the external memory device 13, besides the image data parts, owing to the fact that the respective images commonly possess the image data part requiring the most memory capacity, the memory capacity may be substantially reduced as compared with that of the case where all image data are stored for each one image, if the number of products is sufficiently large.

Figure 9A:
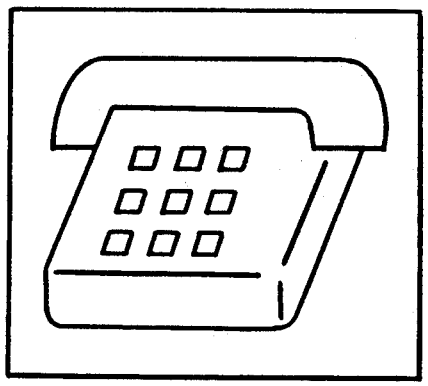
FIG. 9(A) is a diagram showing an image of a product No. "II" given on the image display unit.

When the respective data files are formed as described above, through operation of the keyboard 11 by the operator, the combination information is read out from the external memory device 13, and one product No. is selected. If the product No. selected at this time is "II", the image data part with the ID number "1" for the main body, the image data part with the ID number "2" for the push-button, and the image data part, with the ID number "5" for the corner portions, are respectively read out again from the external memory device 13. Furthermore, according to the positional information read out from the external memory device 13, the image data part for the main body, the image data part for the push-button, and the image data part for the corner portions are respectively written in so as to respectively overlap the bit map on the VRAM 4 based on the coordinates (0,0),(200,200) and (0,400). Then, the image of the telephone set as shown in FIG. 9(A) is displayed on the display screen of the image display device 15.

Figure 9B:
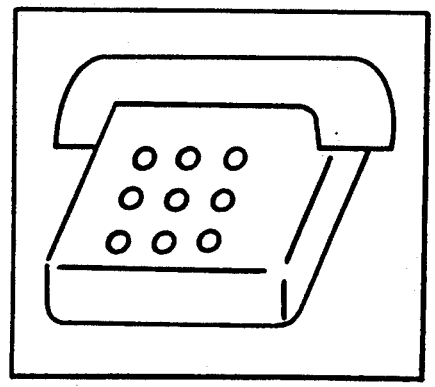

Subsequently, when the operator selects the part image data part of the ID number "3" through operation of the keyboard 11, the part image data for this ID number "3" and the positional information therefor are read out from the external memory device 13. Then, when this image data part is written in the bit map on the VRAM 4 based on the coordinates (200,200) for the push-button, with reference to the above part information and positional information. Then, an image of the telephone set, different only in the shape of the push-buttons, may be displayed through an extremely simple procedure as shown in FIG. 9(B). In the above case, since only the image data part for the push-buttons is read out from the external memory device 13 so as to be written in the VRAM 14, the processing time is reduced as compared with the case where the image data for one complete image is to be read and written in. Upon operation of the keyboard 11 by the operator for recording, the fresh image thus formed is automatically recorded as a product No. "III" in the data file of the combination information stored in the external memory device 13 by the processing program of the image data base. In other words, this means that the fresh image is recorded by merely adding the record of the combination information consisting of enumeration of the ID numbers. Meanwhile, with the coordinates for the positional information altered, if this image data part is read out from the external memory device 13 and written in the VRAM 14, an image having only the position of its part altered, is to be formed. In the above case, if the altered positional information is stored in the external memory device 13 as a separate record from the original positional information, images different only in the positions of the parts according to the respective product numbers of the combination information may be formed through selection of such positional information. Subsequently, in the similar manner, by displaying various images on the image display device 15 for recording depending on necessity, external shape designing of the telephone set is effected. For changing the image data part itself, it may be arranged that, by altering the image displayed on the image display device 15 through operation of the keyboard 11, or by forming the image data part after the alteration through the image input device 12, such image data is replaced by the equivalent part image data stored in the external memory device 13. In this case, it is regarded that the same alteration is made with respect to all the images designating the altered part of the image data by the combination information.

As is clear from the foregoing description, the image data managing unit according to the second embodiment of the present invention includes the image data memory for storing image data parts representing any desired portion of one image and also attribute information of the image data parts respectively; the combination memory device for storing combination information which represents the combination of respective image data parts necessary for forming one image by enumerating each of the attribute information; the position memory device for storing positional information which designates respective positions on the image, of the respective image data parts necessary for forming one image; and the image output device which respectively reads out, from the image data memory, the image data part corresponding to the respective attribute information enumerated in the combination information stored by the combination memory device, and which outputs the respective image data part as read out so as to be disposed at the predetermined positions on the image according to the positional information stored by the position memory device.

Therefore, favorable effects as follows may be obtained.

(1) Since the common image data part such as the elements found in many images which can be outputted, is stored as one record within the data file by the image data memory device so as to be commonly utilized by the respective images, although the combination information and positional information must be separately stored, such a loss that the image data requiring particularly large memory capacity stored in the memory device in duplication is eliminated, thus resulting in the reduction of the memory capacity.

(2) Owing to the fact that, by only altering the image data part of one record stored in the image data memory, it is regarded that the same alteration is effected with respect to all the images using this image data part as the element, and thus, any loss is eliminated from the image data management.

(3) In the case where, it is intended to alter the image data part only at a portion of one image, to the same data as the image data part becoming a portion of the other image, merely the corresponding attribute information in the respective attribute information as enumerated in the combination information for forming the image to be altered, is required to be rewritten to the same one as for the other image, and thus, the managing work is easily facilitated. Moreover, also in the case where, merely the arrangement of a portion of the part image data part is to be altered, only the contents of the corresponding coordinates in the coordinated enumerated part in the positional information for forming this image are required to be altered, and thus, the work is markedly facilitated.

(4) For comparative review, etc., for example, by sequentially replacing for display, only the part image data at a portion of the image, it is merely required to output only the image data part for replacement with the original image data part, and thus, processing time and the operator's waiting time may be advantageously reduced.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as included therein.

What is claimed is:

1. An image designating system which utilizes a plurality of previously stored categorized variations of image data parts to allow a user to create an optimal new image design, comprising:

memory means including a first area for storing each of a plurality of basic image data elements;

said memory means including a second area for storing a plurality of identification numbers for each of a plurality of categories, one corresponding to each of said basic image data elements, each corresponding to a variation of basic image elements in each category, so as to categorize a plurality of variations for each category;

said memory means including a third area for storing positional information of a display means corresponding to each of said plurality of categories, wherein each basic image data element in the same category is designated by a common position;

input means, operatively connected to said memory means, for selecting one basic image data element of each of said plurality of categories by inputting an identification number corresponding to a basic image data element for each of said plurality of categories;

access means for sequentially and automatically accessing each basic image data element corresponding to each input identification number, the category corresponding to the accessed basic image data element and the positional information corresponding to the accessed category;

display means for displaying a combination of selected basic image data elements, each basic image data elements displayed in accordance with the corresponding accessed positional information, in response to said input means;

said memory means storing said selected and displayed combination of basic image data elements and assigning and storing an identification number to said stored combination, in response to said display means;

said input means subsequently selecting a previously stored identification number to access a previously stored combination;

said display means displaying said previously stored selected combination in response to said input means;

said input means selecting a different basic image data element, different from that basic image data element displayed for at least one of the plurality of categories as part of said previously stored selected combination, to thereby form a new combination with the different selected basic image data element replacing the previous basic image element based on the stored position information corresponding to said at least one of the plurality of categories, in said new combination;

said display means immediately displaying said new combination, with each basic image data element displayed at its predetermined display position; and said memory means storing said new combination and a corresponding new identification number in response to said display means, while maintaining said previously stored combination and previous identification number.

2. A method, in an image designing system, which utilizes a plurality of previously stored categorized variations of image data parts to allow a user to create an optimal new image design, comprising the steps of:

a) storing each of a plurality of basic image data parts necessary for design of a desired object in a first memory area;

b) storing a plurality of identification numbers, corresponding to each of said image data parts in a second memory area, each identification number corresponding to a variation of each of said image data parts, a plurality of variations for each of said image data parts being stored as the same category;

c) storing positional information of a display device, the positional information being common for all of said image data parts in the same category, in a third memory area;

d) selecting one variation corresponding to a basic image data part, for each of said plurality of categories, to form a combination of the image data parts selected;

e) accessing each selected variation of the image data parts in each category in the combination based upon the selected information of step d), the image data part corresponding to each accessed variation in each category, and the positional information corresponding to each accessed category of parts;

f) displaying the formed combination of selected variations of each category of image data parts, each at the corresponding category display position, on the display device;

g) storing said selected and display combination of selected variations of each category of image data parts and assigning and storing an identification number corresponding to said stored combination;

h) repeating steps d-g) to similarly select, access, display, store and assign a plurality of identification numbers to combinations of selected variations of image data parts;

i) selecting one of said plurality of previously stored identification numbers corresponding to one of said plurality of previously stored combinations and displaying said combination subsequent to inputting the corresponding identification number;

j) selecting a different variation of an image data part, different from that basic image data part displayed with said previously stored selected combination but in the same category, to thereby form a new combination, with the different selected variation replacing the previous variation of an image part, at the same position based on the same category in said new combination;

k) displaying said new combination, with each selected basic image data part displayed at the predetermined category display position; and l) storing said new combination and a corresponding new identification number, while maintaining said previously stored combination, selected in step j), and previous corresponding identification number.

3. An image storage and access system comprising:

image memory means for storing each of a plurality of basic image elements;

image access memory portion for storing a plurality of image categories and corresponding attribute information designating each of the plurality of basic image elements in an image category;

positional memory portion for assigning positional location, on a display screen, for each image category, wherein each basic image element in the same category is designated by a common position;

input means for inputting attribute information to select at least one of the basic elements;

access means for receiving said input attribute information, for accessing a basic image element corresponding to said input attribute information from said image memory means, for accessing the image category corresponding to the accessed basic image element from said image access memory portion, and for accessing the positional location of said basic image element corresponding to the accessed image category from said positional memory portion; and a display screen for displaying said accessed basic image element in the accessed positional location on the display screen.

4. The image storing and access system of claim 3 further comprising:

combination storage means for storing attribute information for each image category as an image entry, said combination storage means storing a plurality of image entries, each entry designated by a sequential numerical value.

5. The image storage and access system of claim 4, wherein said input means inputs a numerical value when selected;

said access means accesses attribute information for each image category of the entry corresponding to the input numerical value; and said display means displays the corresponding and subsequently accessed basic image elements, corresponding to the accessed attribute information, and displays the corresponding basic image elements in accessed positional locations on the display screen.

6. The image storage and access system of claim 5, wherein said input means, upon said display screen displaying basic image elements for each of the plurality of image categories, can input different attribute information for at least one of said image categories and this new image entry, with the new input attribute information replacing the previous attribute information, will be automatically stored and assigned the next sequential numerical value in said combination storage means; and said display screen subsequently displaying the basic elements of the new entry of the combination storage means to thereby allow a user easy modification of an image and automatic storage of the new image.

7. A method of image storage and access comprising the steps of:

(a) storing each of a plurality of basic image elements;

(b) storing a plurality of image categories and corresponding attribute information designating each of the plurality of basic image elements as belonging to an image category;

(c) storing display position information for each image category, wherein each basic image element in the same category is designated by a common position;

(d) inputting attribute information to select at least one of the basic elements;

(e) accessing the basic image element corresponding to the input attribute information, the image category corresponding to the accessed basic image element, and the positional location corresponding to the accessed image category; and (f) displaying the accessed basic image element in the accessed positional location on a display screen.

8. The method of claim 7 further comprising the steps of:
- (g) inputting attribute information, one for a basic image element in each of the plurality of image categories; and
- (h) storing the input attribute information for a basic image element in each of the plurality of image categories as an image entry, each subsequent image entry being stored separately and assigned a sequential numerical value.

9. The method of claim 8 further comprising the steps of:
- (i) inputting a numerical value corresponding to a previously stored image entry;
- (j) accessing the attribute information corresponding to the input image entry, the basic image element corresponding to each accessed attribute information, the image category corresponding to each accessed basic image element, and the positional location corresponding to each accessed image category; and
- (k) displaying the accessed basic image elements in corresponding accessed positional locations on the display screen to thereby display an image corresponding to the image entry.

10. The method of claim 9 further comprising the steps of:
- (l) inputting attribute information, of a basic image element in at least one of the plurality of image categories, the basic image element corresponding to a basic image element different from the basic image element displayed on the display screen;
- (m) storing the newly input attribute information of a basic image element in at least one of the plurality of image categories, together with attribute information of the previously stored basic image elements in the remaining plurality of image categories, as a new image entry; and
- (n) accessing and displaying the basic image elements corresponding to the new image entry by repeating steps (j) and (k) for the new image entry to thereby display a new image in place of the previous image.

* * * * *